United States Patent
Gum

[11] 3,990,781
[45] Nov. 9, 1976

[54] TRANSPARENT SEAL FOR LIQUID CRYSTAL DISPLAY CELLS

[75] Inventor: Donald J. Gum, Orange, Calif.

[73] Assignee: Beckman Instruments, Inc., Fullerton, Calif.

[22] Filed: May 29, 1974

[21] Appl. No.: 474,220

[52] U.S. Cl. .................................. 350/160 LC
[51] Int. Cl.² ................................. G02F 1/13
[58] Field of Search ............ 350/160 LC; 156/106, 156/107, 333

[56] References Cited
UNITED STATES PATENTS

| | | | |
|---|---|---|---|
| 3,373,076 | 3/1968 | Gosnell | 156/333 X |
| 3,616,174 | 10/1971 | Atkins | 350/160 UX |
| 3,736,047 | 5/1973 | Gelber et al. | 350/160 LC |
| 3,751,137 | 8/1973 | Fitzgibbons et al. | 350/160 LC |
| 3,771,855 | 11/1973 | Burns | 350/160 LC |
| 3,781,087 | 12/1973 | Nagasaki | 350/160 LC |
| 3,807,127 | 4/1974 | Stern | 350/160 LC X |
| 3,807,831 | 4/1974 | Soref | 350/160 LC X |
| 3,808,769 | 5/1974 | Gardiner et al. | 350/160 LC X |

*Primary Examiner*—John K. Corbin
*Assistant Examiner*—Matthew W. Koren
*Attorney, Agent, or Firm*—R. J. Steinmeyer; F. L. Mehlhoff

[57] ABSTRACT

A composition and method of forming a seal in a liquid crystal display cell wherein planar glass plates are bonded together with a dispersion of fluorocarbon and an organosilane coupling agent to form a hermetically sealed cell wherein the seal does not react with the liquid crystal material.

8 Claims, 3 Drawing Figures

TRANSPARENT SEAL FOR LIQUID CRYSTAL DISPLAY CELLS

BACKGROUND OF THE INVENTION

This invention relates to a composition and method of making a seal in a liquid crystal display cell. More particularly, the invention relates to a composition and method of fabricating a plastic seal for liquid crystal display cells wherein such seal has the advantages of being transparent, hermetic, and relatively chemically inert to the liquid crystal materials utilized in such display cells.

In fabricating liquid crystal display cells it is common to utilize planar glass plates spaced apart by a small distance and having a seal formed about the outer periphery thereof to form a hermetically sealed cell for confining the liquid crystal material. It is desired that the seal, upon formation, be transparent, hermetic, and relatively chemically inert to the liquid crystal materials used in such displays. Conventional methods of fabricating liquid crystal display cells have been employed in the prior art comprising glass frit. The use of glass frit, however, requires a relatively high temperature around 900° F to effect a hermetic seal, and in cell designs wherein surface rubbing or other treatment of the glass plates is necessary to obtain alignment of the liquid crystal materials within the cell, such temperatures tend to efface the alignment. Accordingly, glass frit seals have not been entirely satisfactory for fabricating liquid crystal display cells.

A variety of organic sealing materials, such as epoxies, urethanes and polyesters have also been used in the prior art for forming such seals. However, these materials are disadvantageous for forming such seals since they tend to deteriorate under conditions of moderate or high humidity. In addition, the liquid crystal materials are effective solvents for many of such organic sealing materials. Accordingly, the liquid crystal materials tend to react with the sealants and the resulting contamination results in degradation of the liquid crystal materials, thereby tending to reduce the useful life of the display cell.

Accordingly, it is an object of the invention to provide a composition and method of making the seal in a liquid crystal display cell wherein planar glass plates are bonded together to form a satisfactory hermetic seal.

It is another object of the invention to provide a composition or method of making a seal in a liquid crystal display cell which does not deteriorate in the presence of high humidity.

It is yet a further object of the invention to provide a composition and method of making a seal in a liquid crystal display cell wherein the sealant does not react with the liquid crystal material or provide contamination to the display cell.

DETAILED DESCRIPTION OF THE INVENTION

Figure 1:
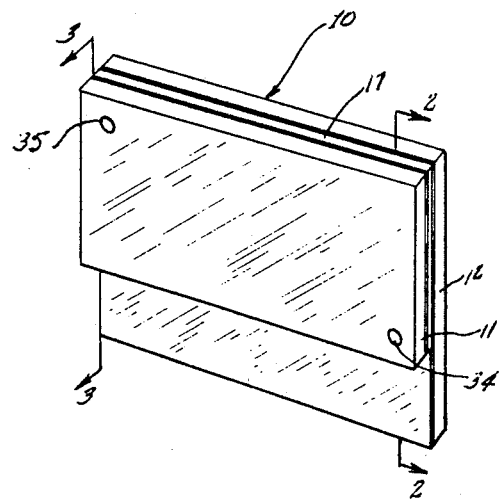
FIG. 1 is an overall perspective view of a liquid crystal display cell utilizing a seal formed in accordance with the invention.
Figure 3:
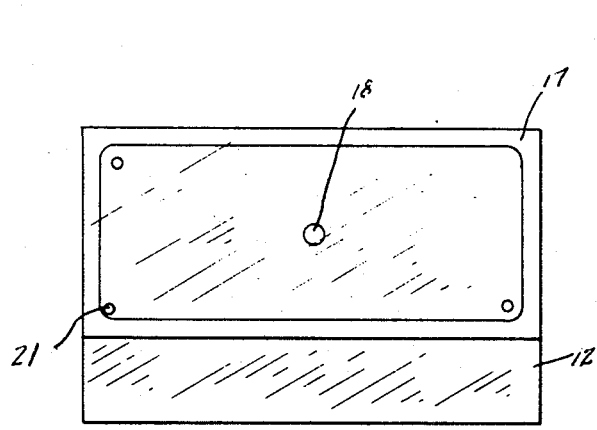
FIG. 3 is an enlarged cross-sectional view taken along lines 3—3 in FIG. 1.
Figure 2:
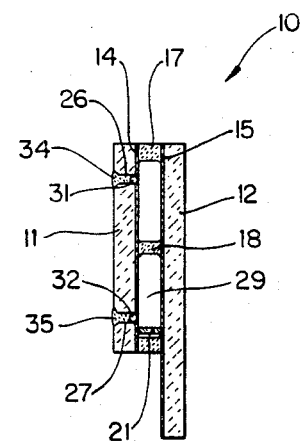
FIG. 2 is an enlarged cross-sectional view taken along lines 2—2 of FIG. 1.

Referring now to FIGS. 1–3, a preferred embodiment of the invention comprises a liquid crystal display cell 10 including front and back plates 11, 12 respectively formed of planar glass plates. Plates 11, 12 are spaced apart by a small distance which may range between 0.0001 inches and 0.05 inches to form a volume for confining liquid crystal material within a display cell. Transparent conductive films or electrodes 14, 15 are formed on the inner surfaces of plates 11, 12, respectively. A seal 17 is provided about the outer periphery of plates 11, 12 to provide a hermetic seal or bond between the plates. Also, as shown in FIG. 2, a glass bead 18 is provided in the center of the cell between plates 11, 12 to provide additional support as necessary to maintain parallelism of the cell walls. Bead 18 can be formed of the same material as seal 17.

In the preferred embodiment seal 17 and bead 18 are formed of a dispersion of a fluorocarbon material and an organosilane coupling agent, as explained in detail hereinafter.

As shown, plate 12 is of slightly longer dimension than plate 11 whereby it over-extends the lower edge of plate 11. Accordingly, conductive film or electrode 15 is exposed to the exterior of the cell and suitable electrical connections can be made thereto in order to apply voltage to the cell for operation thereof.

Also as shown in FIGS. 2 and 3, an electrical interconnect 21 can be provided within the corner of the cell extending between electrodes 14, 15 adjacent seal 17. Such an electrical interconnect may be desired to make contact between the leads on plate 12 and the ground plane of electrode 14. Such an interconnect is preferably composed of an electrically conductive dispersion of metal such as gold or silver in a fluorocarbon matrix.

The cell structure otherwise includes openings 26, 27 through plate 11 for the purpose of filling the cell with liquid crystal material, such as that indicated by numeral 29. After filling of the cell, openings 26, 27 are preferably sealed with a hermetic type seal including a fluorocarbon, glass or metal sphere, such as spheres 31, 32, imbedded in the bottom of the hole backed by a fluorocarbon sealant material such as that indicated by numerals 34, 35.

The preferred method of fabricating a seal for the liquid crystal display cell described is set forth in the following examples:

EXAMPLE I

One hundred grams of vinylidene fluoride resin dispersion (available as Kynar 202) were mixed with 20 grams of vinylidene fluoride powder (available as Kynar powder No. 451). To this were added 12 grams of a substituted alkoxysilane solution (available as Hughson Chemical AP-132) as a coupling agent. The mixture was dispersed initially with a metal spatula, then intimately dispersed by mixing in an automatic mortar and pestle for one hour. 0.075 grams of glass beads of 18-micron diameter were then mixed in to the material. This mixture was then screen-printed in the desired edge configuration on the inner surfaces of each of the two glass plates which form the cell. The plates were heated at 600° F for 75 seconds. In the next operation, pairs of plates were clipped together. These assembled cells were then processed at 500° F for 15 minutes while under a steady clamping pressure. They were then allowed to cool, and the clamping pressure was not released until the cell temperature fell below 200° F. At this point the cell is ready to be filled with liquid crystal material.

EXAMPLE II

As in Example I, 100 grams of Kynar 202 were mixed with 20 grams of Kynar powder No. 451. The organosilane coupling agent was applied to the glass cell plates, and allowed to dry for five minutes. Next, the fluorocarbon dispersion was screen-printed over the silane coupling agent. The remainder of the process was carried out as in Example I.

The fluorocarbon plugs 34, 35 can also be fabricated utilizing the techniques described in Example I and Example II.

The seal described herein for a liquid crystal display cell offers all the desired advantages described hereinbefore, i.e. the seal is transparent, hermetic, and substantially chemically inert to the liquid crystal materials commonly used in displays.

It should be recognized that other percentages by weight of Kynar 202 and alkoxysilane could be utilized successfully. It is believed that satisfactory bonding can be attained with mixtures containing from 2 percent to 25 percent silane solution, with corresponding changes in the amount of fluorocarbon.

A dispersion of about 60 to 85% by weight vinylidene fluoride resin, about 15% by weight vinylidene fluoride powder, and about 2 to 25% by weight substituted alkoxysilane solution is within the scope of this invention. Also within the scope of this invention is a dispersion of about 77% by weight vinylidene fluoride resin, about 15% by weight vinylidene fluoride powder, and about 8% by weight substituted alkoxysilane solution.

What is claimed is:

1. An improved liquid crystal display comprising a glass envelope having portions thereof bonded together by seal means comprised of an improved sealant material; said display including liquid crystal material disposed in said envelope;

said sealant comprising a fluorocarbon material together with co-operational organosilane coupling agent material, these being adapted and applied to form a tight seal between the glass envelope portions and being selected to be relatively transparent, hermetic and substantially chemically inert to said liquid crystal material so as not to degrade it or reduce its useful operating life, and so as not to deteriorate in the presence of high humidity or otherwise allow or encourage contamination of said cell.

2. The display cell recited in claim 1 wherein said sealant material comprises a dispersion of vinylidene fluoride intermixed with an alkoxy-silane coupling agent solution.

3. The display cell recited in claim 2 wherein said sealant material comprises a dispersion of a major weight percentage of vinylidene fluoride resin, with a relatively minor weight percentage of vinylidene fluoride powder and of substituted alkoxy-silane coupling agent solution, said sealant comprising the product of these materials as intermixed, disposed upon the bonding margin of said glass envelope portions and cured, in-situ, there, with said portions pressed together and held in contact.

4. The display cell recited in claim 3, wherein said opposed glass plates are also provided with transparent electrode conductor means on the facing surfaces thereof, and are arranged to include electrical interconnect means extending between said electrode means and at least one corner of said cell, said interconnect means comprising a dispersion of conductive metal in a fluorocarbon matrix.

5. The combination as recited in claim 1 wherein said coupling agent comprises an alkoxysilane.

6. The combination as recited in claim 5 wherein said fluorocarbon material is vinylidene fluoride.

7. The combination recited in claim 6 wherein said sealant comprises the product of about 60 to 85% by weight vinylidene fluoride resin plus about 15% by weight of vinylidene fluoride powder and about 2 to 25% by weight of said silane, these being applied and cured in-situ between said bonded portions.

8. The combination recited in claim 7 wherein said sealant comprises the product of about 77% by weight vinylidene fluorocarbon resin plus about 15% by weight vinylidene fluoride powder, and about 8% by weight of said silane.

* * * * *